No. 849,535. PATENTED APR. 9, 1907.
J. J. FIFIELD.
LOCK NUT.
APPLICATION FILED MAR. 22, 1906.

Witnesses.
C. H. Emmett
J. Murphy

Inventor.
James J. Fifield
by Jas. H. Churchill,
Atty.

UNITED STATES PATENT OFFICE.

JAMES J. FIFIELD, OF BOSTON, MASSACHUSETTS, ASSIGNOR OF ONE-HALF TO WILLARD HOWLAND, OF CHELSEA, MASSACHUSETTS.

LOCK-NUT.

No. 849,535.   Specification of Letters Patent.   Patented April 9, 1907.

Application filed March 22, 1906. Serial No. 307,350.

*To all whom it may concern:*

Be it known that I, JAMES J. FIFIELD, a citizen of the United States, residing in Boston, in the county of Suffolk and State of Massachusetts, have invented an Improvement in Lock-Nuts, of which the following description, in connection with the accompanying drawings, is a specification, like letters on the drawings representing like parts.

This invention relates to a nut-lock, and has for its object to provide a simple, efficient, and reliable lock for the nut which can be easily applied and removed without injuring the thread of the bolt to such extent as to prevent the nut being readily removed from or again applied to said bolt. These and other features of this invention will be pointed out in the claims at the end of this specification.

Figure 1:
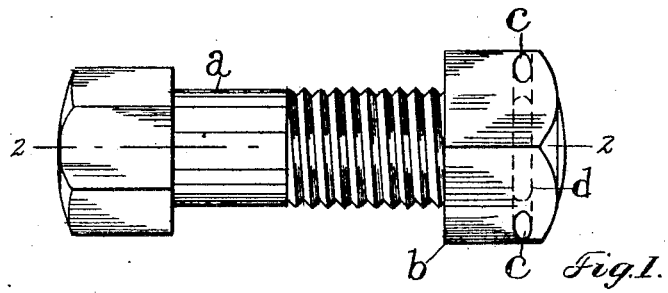
Figure 2:
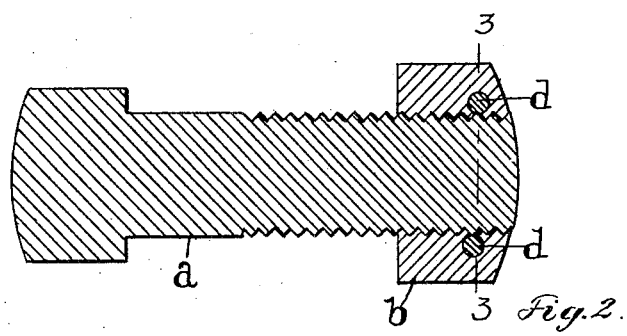

Figure 1 is an elevation of a bolt provided with a nut secured thereon by a lock embodying this invention; Fig. 2, a longitudinal section of the bolt shown in Fig. 1 on the line 2 2; and Fig. 3, a transverse section on the line 3 3, Fig. 2.

Referring to the drawings, $a$ represents a bolt, and $b$ a nut thereon, both of which may be of any suitable or usual construction.

In accordance with this invention the nut $b$ is provided with one or more holes or openings $c$, circular in cross-section and extended transversely of the nut so as to cut the thread of the nut and remove a substantially small portion of one of said threads, and into which hole or opening a portion of a thread on the bolt $a$ projects before the nut is locked, as will now be described.

To lock the nut on the bolt, I employ one or more pins $d$, herein shown as two in number and each of which is circular in cross-section and of a diameter to fit somewhat snugly into the opening $c$ in the nut.

Figure 3:
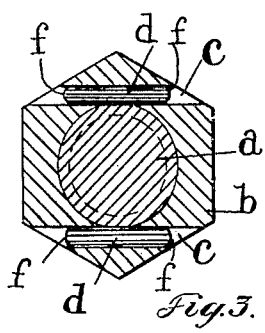

To facilitate entrance of the pin $d$ into the opening $c$ and to avoid severe action on the thread of the bolt which projects into said opening and to enable the pin to be removed from either end of the opening and in some cases to be driven through the opening, both ends $f$ of the cylindrical pin are made rounding or substantially spherical in shape, as clearly shown in Fig. 3.

In many places where the bolt and nut are used it is oftentimes extremely difficult to remove the locking-pin by withdrawing it from the end of the opening in which it is inserted, and to facilitate removal of the pin and unlocking of the nut the pin $d$ is made of less length than the opening $c$ in the nut, as represented in Fig. 3, so that it is wholly within said opening and requires but a limited movement in either direction to disengage it from the thread of the bolt, and as a result either end of the pin is easily accessible for removing it from the nut, which may be effected in close quarters or substantially inaccessible places.

In operation with the lock herein shown the nut is screwed on the bolt, and the pin $d$ is then inserted into the opening $c$, and owing to the end of the pin being round the thread on the bolt which projects into the opening $c$ is not harshly treated or cut, as would be the case with a square-ended pin, but is merely compressed or flattened sufficiently to coöperate with the pin and lock the nut from turning, but not sufficient to prevent the nut from being removed easily and also applied again. In other words, the thread on the bolt is not destroyed, but is merely pressed out of shape, which is partially restored by the removal of the nut. It is preferred to make the pin of hardened steel to prevent it from upsetting. The hole or opening $c$ is made of substantially uniform diameter throughout its length, and the pin is also of uniform diameter throughout its length.

I claim—

1. The combination with a bolt, and a nut threaded thereon having a hole or opening circular in cross-section and extended transversely of said nut to remove a portion of a thread thereof, and a cylindrical pin of substantially the diameter of the hole or opening and having its opposite ends rounded and of less length than the opening or hole in the nut into which it is inserted to permit of a limited movement of the pin while wholly within the said hole or opening.

2. The combination with a bolt, and a nut threaded thereon having a hole or opening circular in cross-section and extended transversely of said nut to remove a portion of a thread thereof, and a cylindrical pin of substantially the diameter of the hole or opening in the nut and having its opposite ends rounded to distort or press a thread of the bolt out of shape without destroying the same and to enable said pin to be entered into and driven out of said hole from either end thereof, substantially as described.

In testimony whereof I have signed my name to this specification in the presence of two subscribing witnesses.

JAMES J. FIFIELD.

Witnesses:
   JAS. H. CHURCHILL,
   J. MURPHY.